(12) United States Patent
Wang

(10) Patent No.: US 6,897,816 B2
(45) Date of Patent: May 24, 2005

(54) INDOOR WIRELESS TELEVISION PROGRAM RECEIVER FOR A TELEVISION

(75) Inventor: Cheng-Si Wang, Changhua Hsien (TW)

(73) Assignee: Trans Electric Co., Ltd., Changhua Hsien (TW)

( * ) Notice: Subject to any disclaimer, the term of this patent is extended or adjusted under 35 U.S.C. 154(b) by 40 days.

(21) Appl. No.: 10/413,954

(22) Filed: Apr. 15, 2003

(65) Prior Publication Data

US 2004/0207561 A1 Oct. 21, 2004

(51) Int. Cl.[7] .................................................. H01Q 1/24
(52) U.S. Cl. ..................................... 343/702; 343/720
(58) Field of Search ................................ 343/720, 721, 343/702

(56) References Cited

U.S. PATENT DOCUMENTS 3,587,105 A * 6/1971 Neilson ....................... 343/710
5,813,765 A * 9/1998 Peel et al. ................... 374/141

\* cited by examiner

*Primary Examiner*—James Vannucci
(74) *Attorney, Agent, or Firm*—William E. Pelton, Esq.

(57) ABSTRACT

An indoor antenna has an antenna assembly with at least one antenna, a controlling circuit, a temperature sensor and a LCD. The controlling circuit has a microprocessor. The microprocessor has a clock and is electronically connected to the temperature sensor and the LCD. The microprocessor obtains a temperature signal from the temperature sensor and keeps time so the LCD can display the temperature and current time in addition to sending broadcast signals received by the antenna to a television. Therefore, the indoor antenna is a multiple function antenna that provides other useful information.

6 Claims, 4 Drawing Sheets

INDOOR WIRELESS TELEVISION PROGRAM RECEIVER FOR A TELEVISION

BACKGROUND OF THE INVENTION

1. Field of the Invention

The present invention relates to an indoor wireless television program receiver for a television, more specifically to an indoor wireless television program receiver that is connected to a television to receive VHF or UHF etc., wireless television programs and provides the wireless television programs to a television. The present invention has multiple functions such a clock and a thermometer.

2. Description of Related Art

Indoor antennas receive broadcast radio frequency audio and video (AV) signals in different bands and usually output the AV signals to televisions. However, televisions also can connect to a television cable to obtain more diverse AV signals to display more TV programs.

With reference to the FIG. 4, a conventional indoor antenna (50) is placed on the television (60). Since conventional indoor antennas (50) only receive broadcast AV signals, the indoor antenna (50) is completely useless when the television (60) displays programs received over the television cable.

The present invention provides a multiple function indoor wireless television program receiver for a television to mitigate or obviate the aforementioned problem.

SUMMARY OF THE INVENTION

An objective of the present invention is to provide an indoor wireless television program receiver for a television that has multiple functions and provides useful information such as time and temperature in addition to receiving broadcast television signals.

Other objectives, advantages and novel features of the invention will become more apparent from the following detailed description when taken in conjunction with the accompanying drawings.

DETAILED DESCRIPTION OF THE PREFERRED EMBODIMENT

The present invention provides a multiple function indoor wireless television program receiver for a television that provides useful functions in addition to a basic broadcast signal reception capability.

Figure 1:
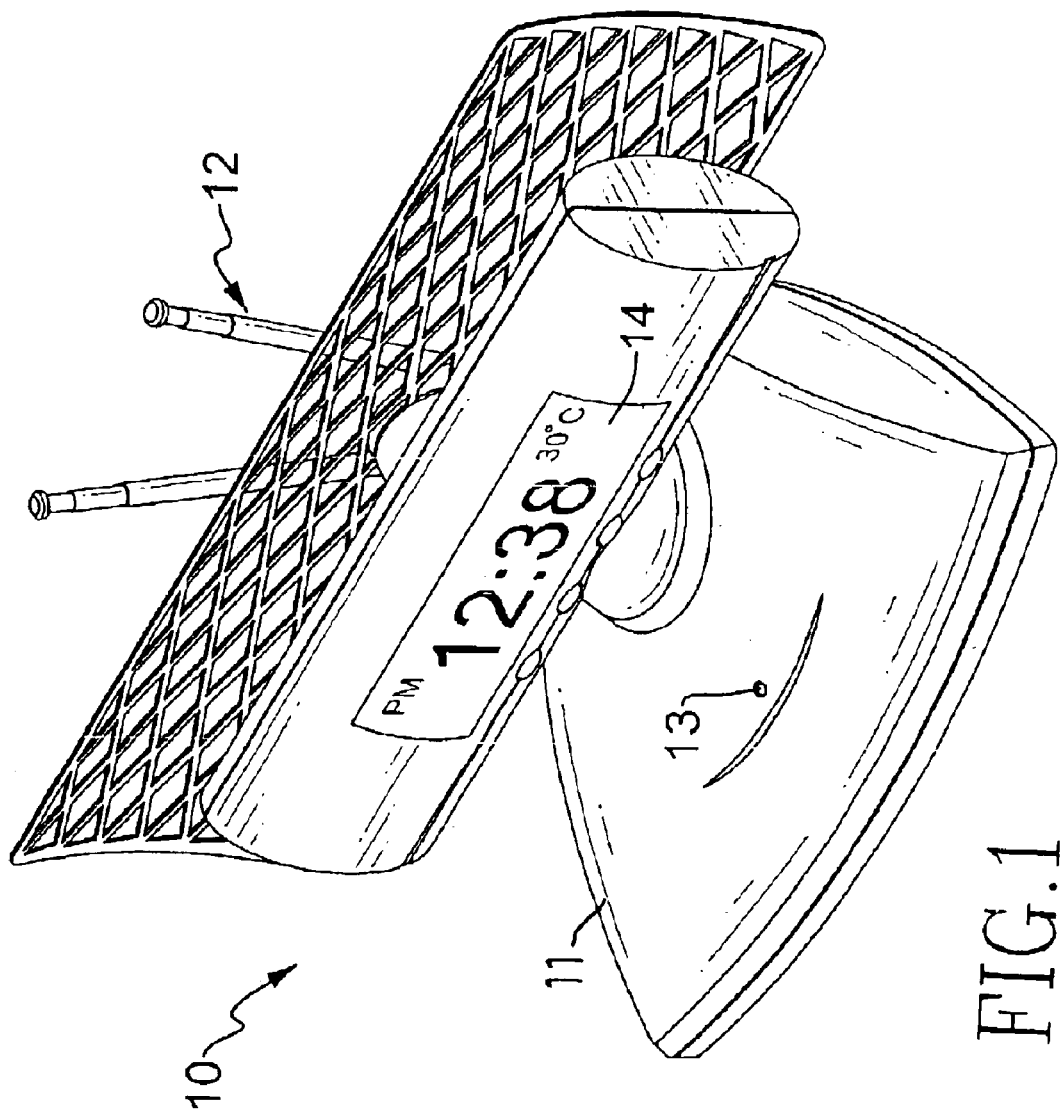
FIG. 1 is a perspective view of an indoor wireless television program receiver for a television in accordance with the present invention.

With reference to FIG. 1, the indoor wireless television program receiver for a television (10) in accordance with the present invention comprises a base (11), at least one antenna (12), a controlling circuit, a temperature sensor (13) mounted on the base (11) and a liquid crystal display (LCD) (14). The antenna (12) is mounted on the base (11). The antenna (12) can be a VHF antenna, a UHF antenna, a combined VHF and UHF antenna or both a VHF antenna and a UHF antenna.

The antenna (12), the temperature sensor (13) and the LCD (14) are electronically connected to the controlling circuit (not shown). The temperature sensor (13) senses temperature and outputs an electronic signal to the controlling circuit. The LCD (14) displays information that is output from the controlling circuit.

Figure 2:
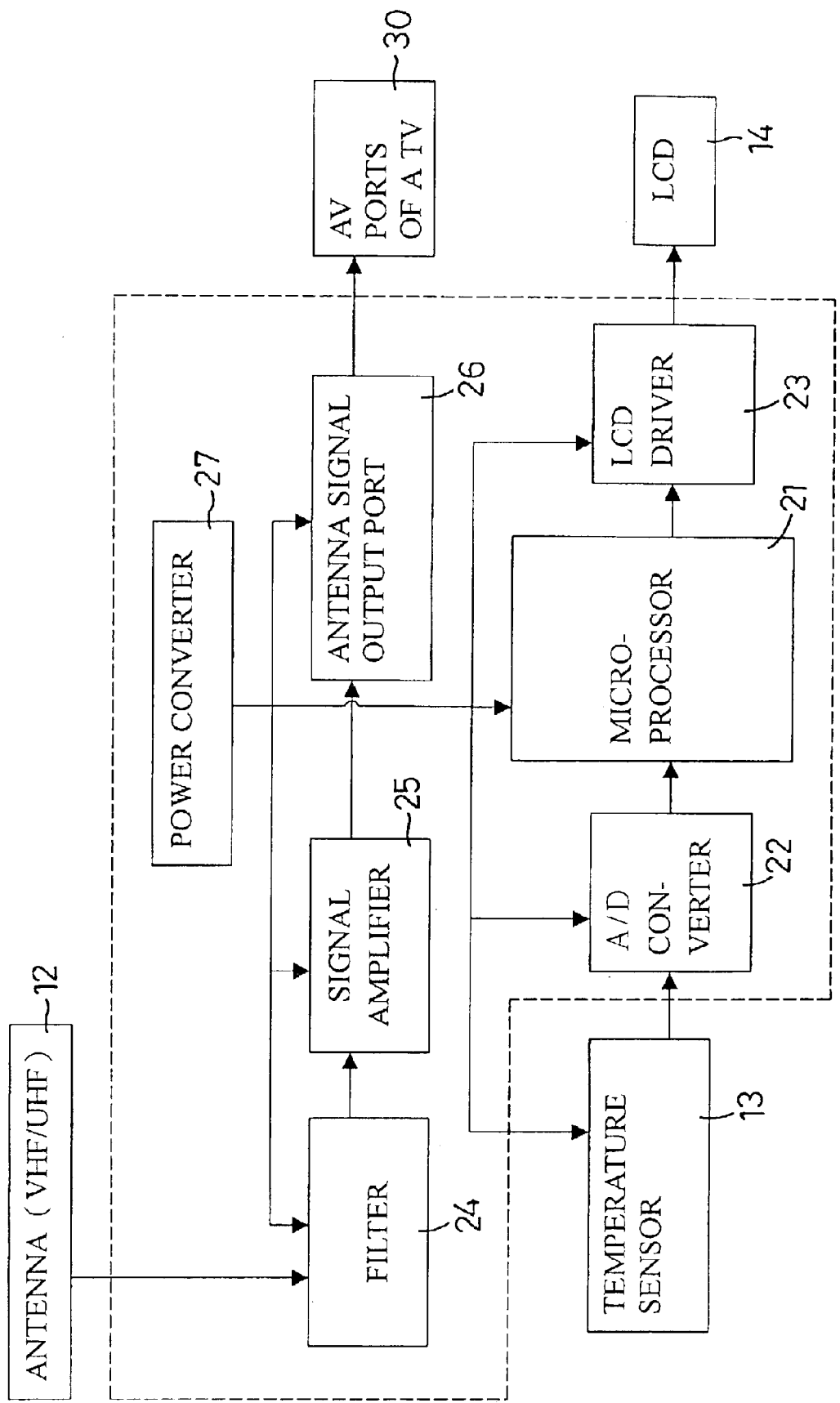
FIG. 2 is a functional block diagram of the indoor wireless television program receiver for a television in FIG. 1.

With reference to FIG. 2, the controlling circuit (20) has a microprocessor (21), an Analogy to Digital (A/D) converter (22), an LCD driver (23), a power converter (27) an antenna signal output port (26) and an antenna signal-processing unit (not numbered). The microprocessor (21) has input and output terminals (not numbered). The antenna signal-processing unit has a filter (24), and a signal amplifier (25). The antenna signal output port (26) is adapted to connect to AV ports (30) on a television (TV). The antenna (12) outputs a received signal to the filter (24). The filter (24) filters noise out of the received signal and send the filtered signal to the signal amplifier (25) that amplifies the filtered signal. Last, the amplified signal is sent to the antenna signal output port (26).

The microprocessor (21) has an internal clock (not shown) and outputs the time through the LCD driver (23) to the LCD (14) where the time is displayed. The temperature sensor (13) generates an analog temperature signal based on the sensed temperature and sends the analog temperature signal to the A/D converter (22). The A/D converter (22) converts the analog temperature signal to digital temperature signal and inputs the digital temperature signal to the microprocessor (21) through an input terminal. The microprocessor (21) generates and outputs a converted temperature signal based on the digital temperature signal through the LCD driver (23) to the LCD (14).

Figure 3:
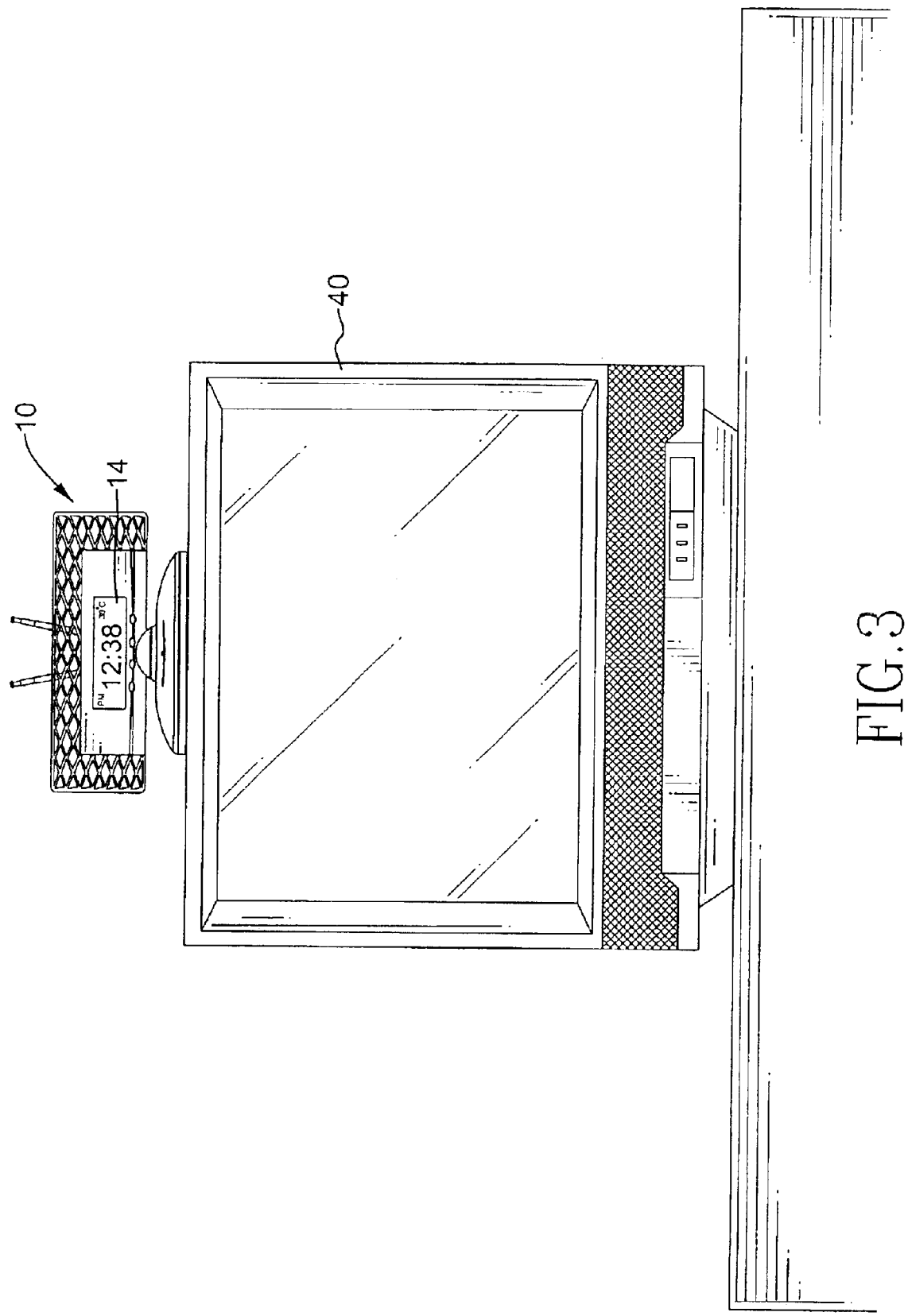
FIG. 3 is an operational front plan view of a television with the indoor wireless television program receiver for a television in FIG. 1.
Figure 4:
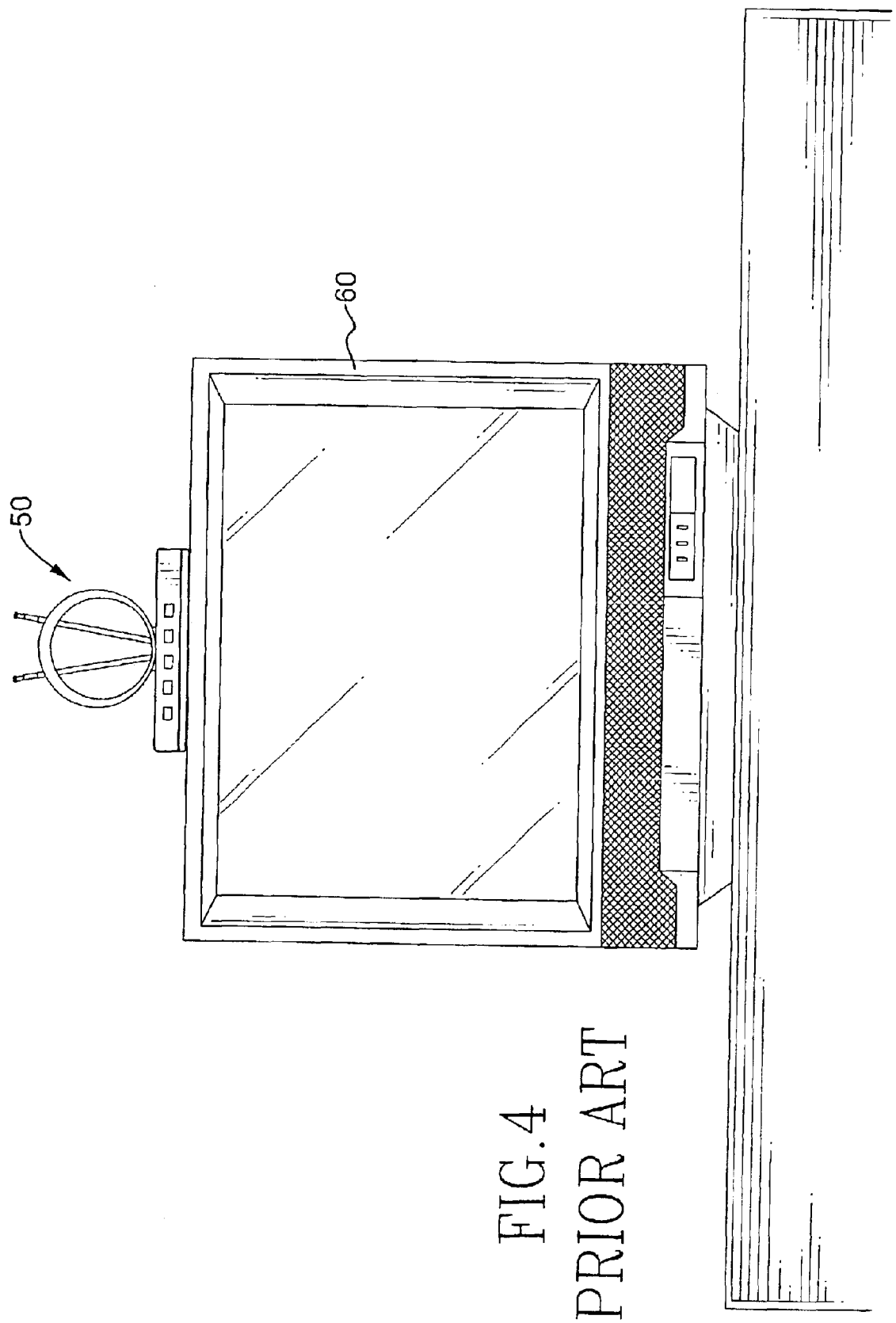
FIG. 4 is an operational front plan view of a television with a conventional indoor antenna.

With reference to FIG. 3, the indoor antenna (10) is placed on a television (40). The indoor wireless television program receiver for a television (10) uses an LCD (14) with a big enough field of vision to display time and the temperature so a person can easily see the information shown on the LCD (14). Even when the indoor wireless television program receiver for a television (10) is not being used to send broadcast signals to the television (40), useful information is provided.

The indoor wireless television program receiver for a television in accordance with the present invention integrates clock and thermometer functions so the indoor antenna provides useful information such as the time and the temperature in addition to a basic antenna capability.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An indoor wireless television program receiver for a television, comprising:
   an antenna assembly having a base and at least one antenna mounted on the base, wherein the antenna is adapted to receive wireless television program signals;
   a controlling circuit mounted in the base, wherein the controlling circuit is composed of a microprocessor having multiple input and output terminals and a clock, an analog to digital converter (ADC) connected to the input terminals of the microprocessor, an LCD driver connected to an output terminal of the microprocessor, an antenna signal output port adapted for connection to an AV port on a television and an antenna signal-processing unit connected to the at least one antenna mounted on the base;

a temperature sensor electronically connected to the ADC and mounted on the base to detect indoor temperature and output a corresponding detecting signal to the microprocessor through the ADC; and a liquid crystal display (LCD) electronically connected to the LCD driver, wherein the microprocessor controls the LCD driver to drive the LCD to display information including clock and indoor temperature.

2. The indoor wireless television program receiver for a television as claimed in claim 1, wherein the antenna signal-processing unit comprises a filter connect to the at least one antenna of the antenna assembly to filter noise out of an antenna signal from the antenna assembly and provide a filtered signal; and a signal amplifier connected to the filter and the antenna signal output port to amplify the filtered signal and output the amplified and filtered signal to the antenna signal output port.

3. The indoor wireless television program receiver for a television as claimed in claim 2, wherein the antenna is a VHF antenna.

4. The indoor wireless television program receiver for a television as claimed in claim 2, wherein the antenna is a UHF antenna.

5. The indoor wireless television program receiver for a television as claimed in claim 2, wherein the antenna is a combined VHF and UHF antenna.

6. The wireless television program receiver for a television antenna as claimed in claim 2, wherein the antenna is a VHF antenna and a UHF antenna.

* * * * *